US006588115B1

(12) United States Patent
Dong

(10) Patent No.: US 6,588,115 B1
(45) Date of Patent: Jul. 8, 2003

(54) COMBINATION LASER LEVEL LINE AND PLUMB LINE GENERATOR

(76) Inventor: Dawei Dong, 44121 So. Grimmer Blvd., Fremont, CA (US) 94538

( * ) Notice: Subject to any disclaimer, the term of this patent is extended or adjusted under 35 U.S.C. 154(b) by 0 days.

(21) Appl. No.: 10/100,875

(22) Filed: Mar. 18, 2002

(51) Int. Cl.[7] .............................. F21K 7/00; F21V 8/00
(52) U.S. Cl. ..................... 33/227; 33/DIG. 21; 362/259
(58) Field of Search ................... 33/227, 283, 286, 33/297, DIG. 21; 362/119, 259; 359/362, 569, 622

(56) References Cited

U.S. PATENT DOCUMENTS

| | | | | |
|---|---|---|---|---|
| 5,539,990 A | * | 7/1996 | Le ................................ 33/283 |
| 5,836,081 A | * | 11/1998 | Orosz, Jr. .................... 362/259 |
| 5,864,956 A | * | 2/1999 | Dong ........................... 33/227 |
| 5,992,029 A | * | 11/1999 | Dong ........................... 33/227 |
| 6,007,218 A | * | 12/1999 | German et al. ............. 362/259 |
| 6,163,969 A | * | 12/2000 | Jan et al. ...................... 33/286 |
| 6,195,902 B1 | * | 3/2001 | Jan et al. ............... 33/DIG. 21 |

* cited by examiner

Primary Examiner—G. Bradley Bennett
(74) Attorney, Agent, or Firm—The Kline Law Firm

(57) ABSTRACT

A combination laser level line and plumb line generation device that utilizes a single laser generator module to create perpendicular lines, a level line and a plumb line. In line with the laser generator module is a first optical unit that generates a vertical line. The first optical unit has a central aperture which allows a portion of non-refracted light to pass through. The non-refracted light then passes through a second optical unit, the second optical unit creating a horizontal line. With this configuration, the single laser generator module can be used to create a pair of orthogonal lines. This allows the elements to be manufactured into a simple and inexpensive combination laser level line and plumb line generation device.

10 Claims, 2 Drawing Sheets

COMBINATION LASER LEVEL LINE AND PLUMB LINE GENERATOR

BACKGROUND OF THE INVENTION

1. Field of the Invention

The present invention relates generally to laser line generators, and more particularly is a tool that produces a level line and a perpendicular plumb line using a single laser module.

2. Description of the Prior Art

Lasers have been used in the construction industry for many years. Laser levels and laser plumb lines are very useful instruments which produce a plane of light that serves as a reference line for construction projects. However, the laser line instruments can cost thousands of dollars, so only those who regularly undertake large construction projects can justify the purchase. Early model laser line generators have not achieved widespread adoption by the general public despite the time savings because of the initial cost and unwieldy size of the tools.

The inventor of the present invention has addressed these problems in several previous references. The "Automatic Laser Plumb Line", inventor Dawei Dong, U.S. Pat. No. 5,992,029, disclosed a light, portable, and compact tool that generated a laser line that could be set as a level line or a plumb line. Another invention of Mr. Dong's, the "Level Line and Plumb Line Combination", U.S. Pat. No. 5,864,956, issued Feb. 2, 1999, discloses a single tool that can generate simultaneously a level line and a plumb line.

While the more current tools embodying the above described references are far less expensive, smaller, and easier to use than earlier laser tools, the tools are still somewhat more expensive and complex than optimal.

Accordingly, it is an object of the present invention to provide a combination laser level line and plumb line generation device that is capable of producing both a level line and a plumb line with a single laser module.

It is a further object of the present invention to provide a combination laser level line and plumb line generation device that is simple to construct and easy to use.

It is a still further object of the present invention provide a combination laser level line and plumb line generation device that is economical to produce and use.

SUMMARY OF THE INVENTION

The present invention is a combination laser level line and plumb line generation device. The device utilizes a single laser generator module to create perpendicular lines, a level line and a plumb line. In line with the laser generator module is a first optical unit that generates a vertical line. The first optical unit has a central aperture which allows a portion of non-refracted light to pass through. The non-refracted light then passes through a second optical unit, the second optical unit creating a horizontal line.

With this configuration, the single laser generator module can be used to create a pair of orthogonal lines. This allows the elements to be manufactured into a simple and inexpensive combination laser level line and plumb line generation device.

An advantage of the present invention is that it creates a pair of orthogonal laser light lines using only a single laser generator module.

Another advantage of the present invention is that it simple and relatively inexpensive to manufacture.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
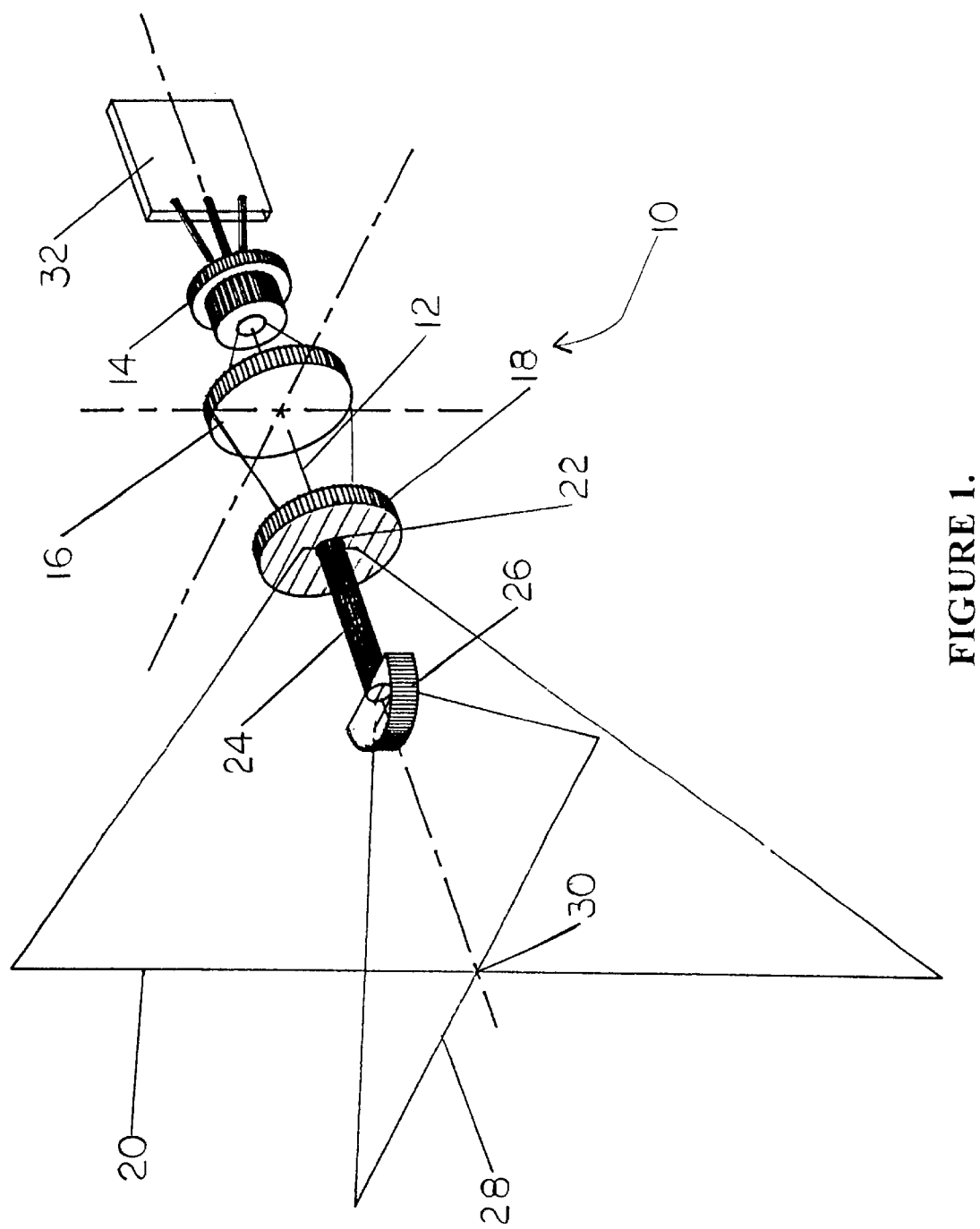
FIG. 1 is a perspective schematic view of a first embodiment of the combination laser level line and plumb line generation device of the present invention.

The present invention is a combination laser level line and plumb line generation device 10. Referring first to FIG. 1, a laser light beam 12 is generated by a laser generator module 14. The laser light beam 12 passes through a focusing lens 16 before the beam 12 is affected by the optical elements of the present invention.

The light beam 12 next passes through a first optical element 18 that operates on the light beam to create a vertical output line 20, the plumb line. In the preferred embodiment, a plastic element with the configuration shown in FIG. 1 is used as the first optical element 18. In the preferred embodiment, the first optical element 18 is a circular disk element oriented with its radial axes perpendicular to the light path. Optical elements capable of generating linear light outputs are known in the art, and thus are not discussed in great detail herein.

An aperture 22 is located in the center of the first optical element 18. The aperture 22 allows a portion 24 of the light beam to pass unaffected through the first optical element 18. The unaffected portion of the light beam 24 then passes through a second optical element 26. The second optical element 26 is positioned such that the light output of the second optical element 26 is a horizontal line 28, the level line. In the preferred embodiment, the second optical element 26 is a glass element chosen for its compact size. The second optical element 26 is a semicircular disk oriented with its a center radius in line with the light path. The flat edge of the second optical element 26 is nearest the first optical element 18.

The end result of the combination laser level line and plumb line generation device 10 is therefore a vertical line 20 that crosses a horizontal line 28 at an intersection point 30 so that a plumb line and a level line are clearly visible to the user of the device 10.

In the preferred embodiment, the device 10 is powered by a DC power supply (not shown). A drive circuit 32 chip is installed in the device 10 to control operation and power supply. It is envisioned that the device 10 will typically be used with pendulum devices for automatic levelling and plumbing of the output lines 20, 28.

Alternate Embodiment

Figure 2:
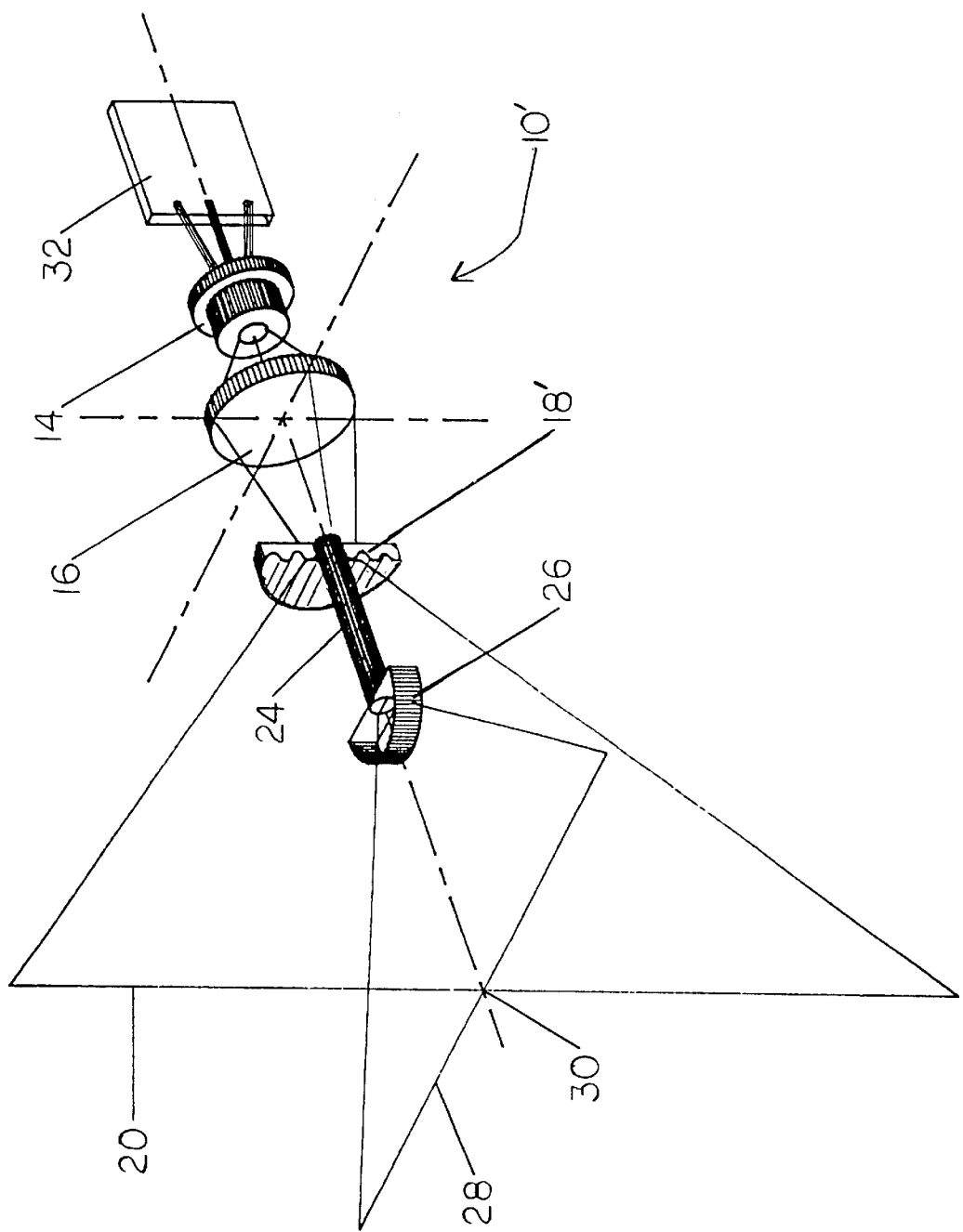
FIG. 2 is a perspective schematic view of a second embodiment of the combination laser level line and plumb line generation device of the present invention.

An alternate embodiment of the combination laser level line and plumb line generation device 10' is illustrated in FIG. 2. The alternate embodiment device 10' shares mostly common components with the first embodiment 10, as indicated by the corresponding reference numbers. The laser generator module 14, the focusing lens 16, and the second optical element 26 are all as utilized in the first embodiment 10.

In the alternate embodiment 10', the first optical element 18' is a line generating disk cut in half to form a semicircular element. The first optical element 18' generates a vertical output line 20 as in the first embodiment, and allows an unaffected portion 24 of the light beam 12 to reach the second optical element 26. The second optical element 26 generates the horizontal level line 28.

As with the first embodiment 10 of the present invention, the end result of the combination laser level line and plumb line generation device 10' is a vertical line 20 that crosses a horizontal line 28 at an intersection point 30, thereby forming a plumb line and an intersecting level line which are clearly visible to the user of the device 10.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

CORRESPONDENCE CHART

10 Combination laser level line and plumb line generation device
12 Laser light beam
14 Laser generator module
16 Focusing lens
18 First optical element
18' Alternate first optical element
20 Vertical output line
22 Aperture
24 Unaffected portion of the light beam
26 Second optical element
28 Horizontal line
30 Intersection
32 Drive circuit

I claim:

1. A combination laser level line and plumb line generation device comprising:

a laser generator module to generate a light beam, and a first optical element, and a second optical element; wherein said first optical element operates on said light beam to create a first light line perpendicular to said light beam, said first optical element allowing an unaffected portion of said light beam to pass through said first optical element unaffected by said first optical element, and said second optical element creates a second light line perpendicular to said light beam and also perpendicular to said first light line; so that a pair of orthogonal lines that are clearly visible to the user of said device are created.

2. The combination laser level line and plumb line generation device of claim 1, wherein:

said first optical element is a circular disk oriented with radial axes perpendicular to said light path.

3. The combination laser level line and plumb line generation device of claim 1, wherein:

said first optical element comprises a central aperture that allows a portion of said light beam to pass through said aperture unaffected by said first optical element.

4. The combination laser level line and plumb line generation device of claim 1, wherein:

at least a portion of said first optical element is cut away so as to allow a portion of said light beam to pass said first optical element unaffected by said first optical element.

5. The combination laser level line and plumb line generation device of claim 1, wherein:

said second optical element is a semicircular disk oriented with a center radius in line with said light path, and wherein a flat edge of said second optical element is positioned toward said laser generator module.

6. The combination laser level line and plumb line generation device of claim 1, wherein:

said light beam passes through a focusing lens before said light beam is affected by said first and said second optical elements.

7. The combination laser level line and plumb line generation device of claim 6, wherein:

said first optical element is a circular disk oriented with radial axes perpendicular to said light path.

8. The combination laser level line and plumb line generation device of claim 6, wherein:

said first optical element comprises a central aperture that allows a portion of said light beam to pass through said aperture unaffected by said first optical element.

9. The combination laser level line and plumb line generation device of claim 6, wherein:

at least a portion of said first optical element is cut away so as to allow a portion of said light beam to pass said first optical element unaffected by said first optical element.

10. The combination laser level line and plumb line generation device of claim 6, wherein:

said second optical element is a semicircular disk oriented with a center radius in line with said light path, and wherein a flat edge of said second optical element is positioned toward said laser generator module.

* * * * *